(12) United States Patent
Kelly et al.

(10) Patent No.: US 6,229,273 B1
(45) Date of Patent: May 8, 2001

(54) ACTUATOR DRIVER CIRCUIT

(75) Inventors: David W. Kelly, Lino Lakes; Robert A. Norman, Bloomington; Haoyan Chen, Eagan, all of MN (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/360,319

(22) Filed: Jul. 23, 1999

Related U.S. Application Data
(60) Provisional application No. 60/121,293, filed on Feb. 23, 1999.

(51) Int. Cl.[7] .............................. H02R 23/00; G11B 5/596
(52) U.S. Cl. ..................... 318/254; 318/138; 318/560; 318/439; 318/293; 360/75; 360/78.04
(58) Field of Search ................................. 318/138, 245, 318/254, 439, 801, 599, 560, 561, 290, 280, 293, 292, 291, 294; 360/78.12, 75, 78.04, 78.01, 78.14, 105; 364/457; 330/146, 277, 293, 267

(56) References Cited
U.S. PATENT DOCUMENTS

| | | | |
|---|---|---|---|
| 5,191,297 | * | 3/1993 | Penman et al. ..................... 330/146 |
| 5,287,046 | * | 2/1994 | Carpenter et al. ................... 318/293 |
| 5,566,369 | * | 10/1996 | Carobolante ........................... 360/75 |
| 5,631,527 | * | 5/1997 | Canclini ............................... 318/254 |
| 5,818,180 | * | 10/1998 | Canclini ............................... 318/254 |
| 5,838,515 | * | 11/1998 | Mortazavi et al. ............... 360/78.12 |
| 5,844,743 | * | 12/1998 | Funches ............................. 360/78.04 |
| 5,877,914 | * | 3/1999 | Gontowski ........................ 360/78.12 |
| 6,023,143 | * | 2/2000 | Salina et al. ......................... 318/599 |
| 6,064,174 | * | 5/2000 | Sziebert ............................... 318/801 |

* cited by examiner

Primary Examiner—Paul Ip
(74) Attorney, Agent, or Firm—Kinney & Lange, P.A.

(57) ABSTRACT

An actuator circuit includes an H-bridge having sense and power FETs to drive a voice coil motor. A differential amplifier configuration is connected to the H-bridge. A bias circuit connected to the H-bridge and to current sources controls bias current through the one sense FET and one power FET and through the other sense FET and other power FET. A common mode feedback is circuit connected to the voice coil motor to provide common mode feedback to the differential amplifier configuration. The FETs, which may be unmatched, are operated to achieve class AB operation.

24 Claims, 2 Drawing Sheets

ACTUATOR DRIVER CIRCUIT

CROSS-REFERENCE TO RELATED APPLICATION(S)

This application claims priority of U.S. Provisional Application No. 60/121,293 filed on Feb. 23, 1999, for "Actuator Predriver Circuit" by David Kelly.

BACKGROUND OF THE INVENTION

The actuator arm in a hard disk drive is operated by a voice coil motor (VCM) to move the read and write heads across the disk. In most disk drive systems, a motor controller integrated circuit (IC) contains the necessary circuitry to regulate the current through the VCM. In higher performance systems, the VCM driver stage is connected directly to the VCM and is not part of the motor controller IC. Typically, the driver stage includes power field-effect transistors, such as N-channel metal oxide field-effect transistors (NMOS FETs), arranged in an H-bridge configuration. To achieve proper class AB operation of the driver stage, all of the FETs in the driver stage must be closely matched. This typically means that all of the FETs are implemented on a single IC, resulting in higher resistance and higher cost. Therefore, a cheaper, more efficient method of achieving class AB operation of unmatched FETs in a driver stage for a voice coil motor is needed.

BRIEF SUMMARY OF THE INVENTION

The present invention is an actuator driver circuit that includes an H-bridge configured driver stage where the upper half of the bridge consists of NMOS sense FETs and the lower half consists of standard NMOS power FETs. The driver circuit includes a differential amplifier configuration connected to the control electrodes of the sense FETs of the H-bridge. A bias circuit is connected to the H-bridge for controlling bias currents through sense and power FETs on both sides of the H-bridge. A common mode feedback circuit provides feedback to the differential amplifier configuration.

In preferred embodiments, the bias circuit comprises a first bias amplifier connected to the H-bridge and a current source to control bias current through one sense FET and power FET to maintain the sense FET in an active region. A second bias amplifier is connected to the H-bridge and a current source to control bias current through the other sense FET and power FET to maintain the other sense FET in an active region.

In preferred embodiments, the power FETs are operated to establish the bias current through the sense FETs. The output common mode voltage of the differential amplifier configuration is adjusted so that a common mode voltage on the voice coil motor is equal to a predetermined common mode reference voltage. Preferably, the H-bridge is operated to class AB operation.

In one embodiment, the differential amplifier configuration comprises a differential amplifier having respective inputs for receiving command inputs and respective outputs for operating the sense FETs to operate a VCM. The common mode feedback circuit comprises a transconductance amplifier connected to the H-bridge for sensing the common mode voltage of the VCM to control the differential amplifier and adjust an output common mode voltage of the differential amplifier. In another embodiment, the differential amplifier configuration comprises a pair of amplifiers each connected to the command inputs and providing an output to a respective sense FET to operate the VCM. The common mode feedback circuit includes a pair of dividers each having at least two divider impedances connected across a voltage supply. One input of each amplifier is connected to the junction between the divider impedances of a respective one of the pair of dividers, and a feedback circuit is connected between the respective node and the other input of the respective amplifier.

DETAILED DESCRIPTION

Figure 1:
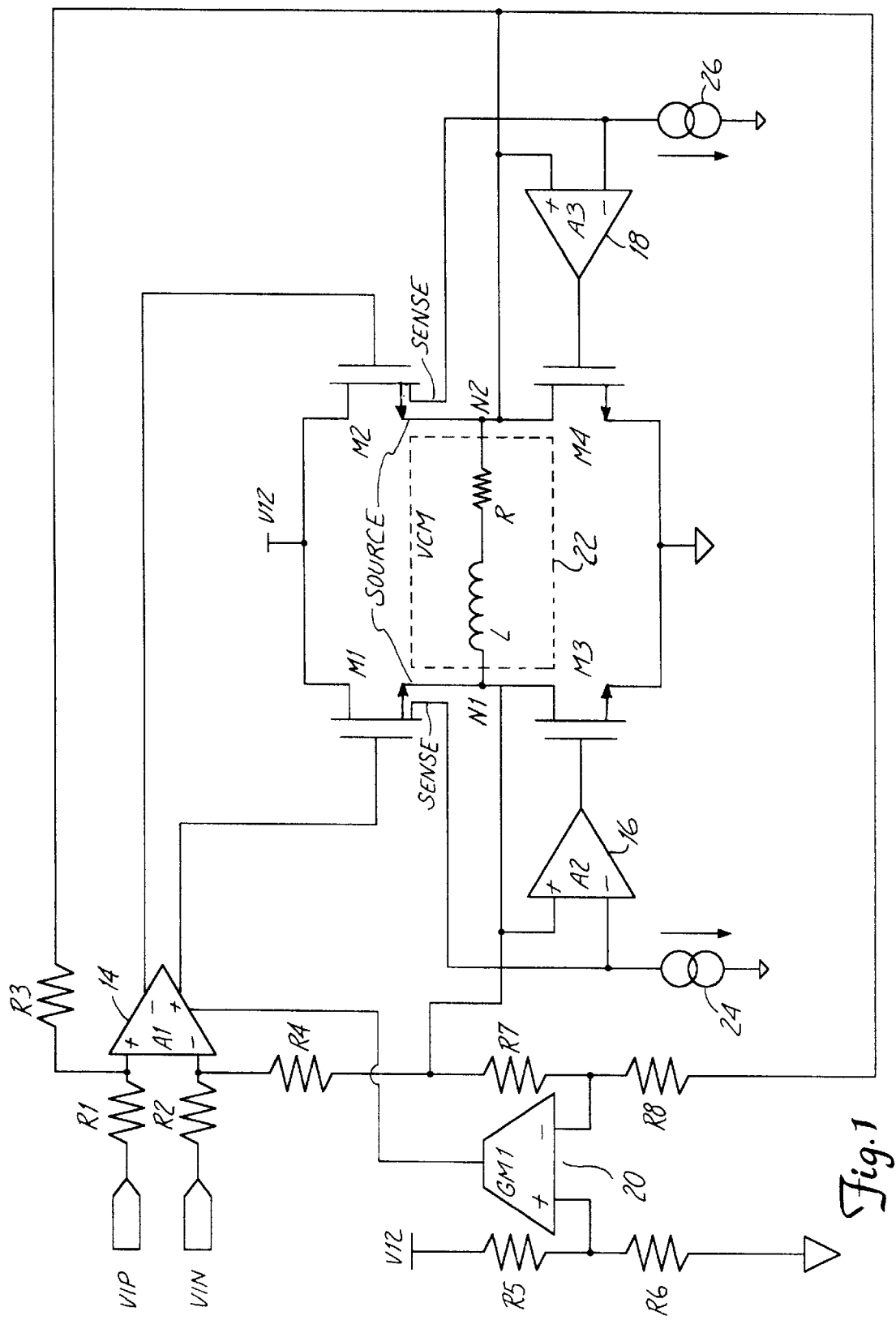
FIG. 1 is schematic diagram of a preferred embodiment of an actuator driver circuit for providing a controlled driver bias current.

FIG. 1 shows an actuator arm voice coil motor 22 having an internal inductance L and resistance R. Motor 22 is connected between first and second nodes N1 and N2 and operated by a voice coil driver circuit according to the present invention.

The driver circuit includes an H-bridge consisting of NMOSFETs M1, M2, M3 and M4, amplifiers 14, 16 and 18, transconductance amplifier 20, and first and second current sources 24 and 26. NMOSFETS, M1–M4 are configured in an "H" to provide current to the voice coil motor 22 through nodes N1 and N2. The upper half of the H-bridge consists of NMOS sense FET's M1 and M2 and the lower half of the H-bridge consists of standard NMOS power FETs M3 and M4. Each sense FET M1 and M2 consists of two FETs constructed in the same silicon substrate, one FET being a small device, and the other FET being a large device. The two devices share gate and drain terminals, but have independent source terminals. As used herein, the source terminal of the large device is referred to as the "source" terminal of the sense FET, and source terminal of the small device is referred to as the "sense" terminal of the sense FET. Power FETs M3 and M4 are standard power FETs that have their sources connected together and to ground, their gates connected to the outputs of respective amplifiers 16 and 18, and their drains connected to nodes N1 and N2, respectively. Sense FETs M1 and M2 have their source terminals connected to respective nodes N1 and N2, their sense terminals connected to negative inputs of respective amplifiers 16 and 18, their drains connected to $V_{12}$ and their gates connected to opposite outputs of amplifier 14.

Amplifier 14 has its positive input connected to input source $V_{IP}$ through resistor R1 and to node N2 through feedback resistor R3, its negative input connected to input source $V_{IN}$ through resistor R2 and to node N1 through feedback resistor R4, its positive output connected to the gate of sense FET M1, and its negative output connected to the gate of sense FET M2. Amplifier 14 also has a control input connected to the output of transconductance amplifier 20. Amplifier 16 has its positive input connected to node N1, its negative input connected to current source 24 and the sense terminal of sense FET M1, and its output connected to the gate of power FET M3. Amplifier 18 has its positive input connected node N2, its negative input connected to current source 26 and the sense terminal of sense FET M2, and its output connected to the gate of power FET M4. Transconductance amplifier 20 has its positive input connected to a voltage divider comprising resistors R5 and R6, its negative input connected between resistors R7 and R8, and its output connected to the common mode control input of amplifier 14. Resistors R7 and R8 are connected to nodes N1 and N2, respectively.

Amplifier 14 is a high gain, fully differential operational amplifier. A differential feedback network consisting of resistors R1 and R3 and resistors R2 and R4 limits the gain of amplifier 14. The open loop gain of amplifier 14 is large enough to compensate for any mismatch error between sense FETs $M_1$ and $M_2$. In one preferred embodiment resistors $R_1$ and $R_2$ provide a resistance of 4 KΩ and resistors $R_3$ and $R_4$ provide a resistance of 48 KΩ, giving a closed loop gain of 12. Voltage $V_{12}$ is nominally 12 volts. In order to provide the maximum voltage swing in the output stage, the supply voltage for amplifier 14 is greater than the voltage on $V_{12}$, achieved with a positive supply greater than 12 volts and the negative supply of ground. Amplifiers 16 and 18 form a bias circuit that controls bias current through the first and second sense FETs and the first and second power FETs to maintain the first and second sense FETs in an active region.

Transconductance amplifier 20 along with resistors R5, R6, R7, and R8 provide a common mode feedback path from the driver stage output to amplifier 14. Resistors R7 and R8 are preferably equal to provide the common mode voltage of the voice coil motor to the negative input of transconductance amplifier 20. Resistors R5 and R6 form a voltage divider to provide a common mode reference voltage to the positive input of amplifier 20. Perferably, resistors R5 and R6 are equal, so the reference voltage is one half of voltage $V_{12}$ (e.g. 6 volts). Transconductance amplifier 20 provides a current to amplifier 14 that is proportional to the difference between the common mode voltage on voice coil motor 22 and the common mode reference voltage. This current causes the output common mode voltage of amplifier 14 to move up or down until the common mode voltage on the voice coil is approximately equal to the common mode reference voltage. Thus, the common mode feedback circuit keeps the common mode voltage on voice coil motor 22 centered between ground and $V_{12}$.

When the current through voice coil motor 22 is nearly zero, amplifier 16 operates the gate of power FET M3 to maintain a bias current through sense FET M1 and power FET M3. The bias current through the source terminals of FETs M1 and M3 is equal to the current of current source 24 times the sense FET ratio of M1. The sense FET ratio is the ratio of active areas of the large and small sources of the sense FET device and is defined by the manufacturer of the sense FET. The current ratio (i.e., the ratio of the source current to the sense current) is the ratio of the active areas (the sense FET ratio), provided that the device is biased to the active region and the source and sense terminal voltages are equal.

Current source 24 is tightly controlled by the motor controller IC (not shown) using well known integrated circuit techniques. Thus, current source 24 pulls a precisely defined sense current out of the sense terminal of sense FET M1. The inputs of amplifier 16 are connected to the source and sense terminals of sense FET M1 to adjust the voltage on the gate of power FET M3 so that the source terminal voltage equals the sense terminal voltage. As a result, sense FET M1 is biased to maintain the desired sense FET current ratio. Amplifier 16 is designed with sufficiently high gain to compensate for manufacturing variations in the operating characteristics of power FET M3.

Amplifier 18 and current source 26 control the bias current through sense FET M2 and power FET M4 in the same manner. The positive voltage supply for amplifiers 16 and 18 is $V_{12}$, and the negative supply is ground. Current sources 24 and 26 are designed to tolerate voltages as high as the voltage on $V_{12}$.

When current changes direction through the voice coil motor 22, amplifiers 16 and 18 operate differently. For example, when current flows through the voice coil motor 22 from node N1 to node N2, amplifier 18 adjusts the gate voltage on power FET M4 so that the current through power FET M4 equals the desired bias current through sense FET M2 plus the current through voice coil motor 22. Simultaneously, amplifier 16 adjusts the gate voltage on power FET M3 so that the current through power FET M3 equals the current through sense FET M1 minus the current through voice coil motor 22, until the current through power FET M3 drops to zero. When the voice coil motor current is equal to or greater than the target bias current (as set by current source 24 and the sense FET ratio of sense FET M1), amplifier 16 will saturate at its minimum output voltage and the current through power FET M3 will go to zero, turning power FET M3 off. Preferably, the minimum output voltage of amplifier 16 will be clamped to 0.5 volts to guarantee that power FET M3 is off, while minimizing the amplifier slew rate necessary to turn power FET M3 on again when necessary.

Figure 2:
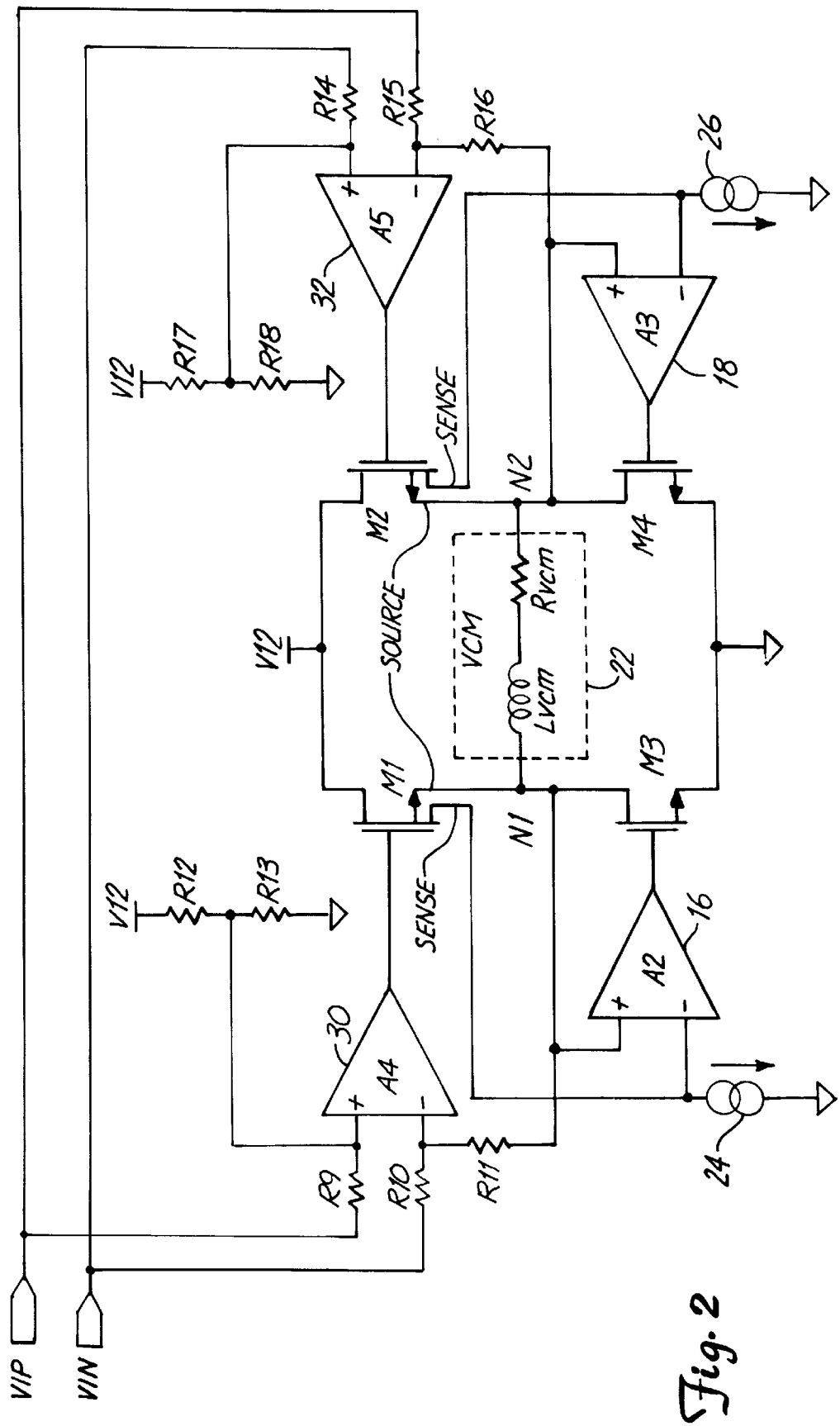
FIG. 2 is a schematic diagram of another embodiment of the driver circuit of the present invention.

FIG. 2 illustrates a modification of the circuit illustrated in FIG. 1, wherein differential amplifier 14 and its associated common mode detection and control provided by transconductance amplifier 20 are replaced with a pseudodifferential amplifier configuration consisting of amplifiers 30 and 32. Amplifier 30 has its positive input is connected through resistor R9 to input $V_{IP}$ and its negative input connected through resistor R10 to input $V_{IN}$. Similarly, amplifier 32 has its positive input is connected through resistor R14 to input $V_{IN}$ and its negative input connected through resistor R15 to input $V_{IP}$. Common mode reference voltages are provided to the positive inputs by voltage dividers consisting of resistors R12 and R13 and resistors R17 and R18, respectively, connected between $V_{12}$ and ground. The negative inputs of amplifiers 30 and 32 are connected through resistors R11 and R16 to nodes N1 and N2, respectively. Amplifiers 30 and 32 provide outputs to the gates of sense FETs M1 and M2, respectively. Resistors R10 and R11 and resistors R15 and R16 provide a differential feedback network, which, together with resistors R9, R12 and R13 and resistors R14, R17 and R18 set the gain of amplifiers 30 and 32. For a differential gain of 12, resistors R9, R10, R14 and R15 are each 5 KΩ, resistors R11 and R16 are each 30 KΩ, and resistors R12, R13, R17 and R18 are each 60 KΩ.

The driver circuit of the present invention takes advantage of the ratiometric matching characteristics of the sense FETs to provide a controlled driver bias current through driver the FETs at the driver crossover point. This allows class AB operation of the driver stage even if the four driver stage devices are poorly matched. The manufacturer of a disk drive requiring class AB driver can thus enjoy a significant cost savings using driver stage devices that do not need to be matched.

Although the present invention has been described with reference to preferred embodiments, workers skilled in the art will recognize that changes may be made in form and detail without departing from the spirit and scope of the invention.

What is claimed is:

1. A driver circuit for operating a voice coil motor of an actuator of a disk drive comprising:

an H-bridge having first and second sense FETs and first and second power FETs, a first node between controlled elements of the first sense FET and the first power FET for connection to a first side of a voice coil motor and a second node between controlled elements of the second sense FET and the second power FET for connection to a second side of the voice coil motor;

a differential amplifier configuration having an input for receiving command signals for operating a voice coil motor connected to the H-bridge, and first and second outputs connected to control elements of respective first and second sense FETs;

a bias circuit having inputs connected to the first and second nodes and to sense elements of the first and second sense FETs and outputs connected to control elements of the first and second power FETs for controlling a bias current through the first sense FET and first power FET and through the second sense FET and second power FET; and a common mode feedback circuit connected to the first and second nodes to provide common mode feedback to the differential amplifier configuration.

2. The driver circuit of claim 1, wherein the bias circuit comprises:

a first bias amplifier having a first input connected to the first node and a second input connected to a current source and the sense element of the first sense FET and its output connected to the control element of the first power FET to control bias current through the first sense FET and first power FET to maintain the first sense FET in an active region, and a second bias amplifier having a first input connected to the second node and a second input connected to a current source and the sense element of the second sense FET and its output connected to the control element of the second power FET to control bias current through the second sense FET and second power FET to maintain the second sense FET in an active region.

3. The driver circuit of claim 2, including a feedback circuit comprising:

a first feedback impedance connected between the second node and a first input of the differential amplifier configuration, and a second feedback impedance connected between the first node and a second input of the differential amplifier configuration.

4. The driver circuit of claim 2, wherein the first and second sense and power FETs are unmatched and the differential amplifier has a high open loop gain to compensate mis-matching of the first and second sense and power FETs.

5. The driver circuit of claim 2 including first and second circuit inputs for receiving first and second command signals, wherein the differential amplifier configuration comprises:

a differential amplifier having first and second inputs coupled to respective first and second circuit inputs, first and second differential outputs connected to respective control elements of the first and second sense FETs, and a control input for receiving a control signal to adjust output signals, and the common mode feedback circuit comprises:

a voltage divider connected between the first and second nodes, and a transconductance amplifier having a first input for receiving a reference voltage and a second input connected to the voltage divider to receive a common mode voltage of a voice coil motor connected to the H-bridge, the transconductance amplifier having an output connected to the control input of the differential amplifier to adjust an output common mode voltage of the differential amplifier.

6. The driver circuit of claim 5, including a feedback circuit comprising:

a first feedback impedance connected between the second node and the first input of the differential amplifier, and a second feedback impedance connected between the first node and the second input of the differential amplifier.

7. The driver circuit of claim 2 including first and second circuit inputs for receiving first and second command signals, wherein the differential amplifier configuration comprises:

a first amplifier having a first input for receiving the first command signal, a second input for receiving the second command signal and an output connected to the control element of the first sense FET, a second amplifier having a first input for receiving the second command signal, a second input for receiving the first command signal and an output connected to the control element of the second sense FET, and and the common mode feedback circuit includes:

a first divider comprising at least two divider impedances for serial connection across a voltage supply, the first input of the first amplifier being connected to a junction between the divider impedances of the first divider, a second divider comprising at least two divider impedances for serial connection across the voltage supply, the first input of the second amplifier being connected to a junction between the divider impedances of the second divider, a first impedance connected between the first node and the second input of the first amplifier, and a second impedance connected between the second node and the second input of the second amplifier.

8. The driver circuit of claim 7, including a third impedance connected between the first input of the first amplifier and the first circuit input, and a fourth impedance connected between the first input of the second amplifier and the second circuit input.

9. The driver of claim 8, including
a fifth impedance connected between the second input of the first amplifier and the second circuit input, and
a sixth impedance connected between the second input of the second amplifier and the first circuit input.

10. The driver circuit of claim 1 including first and second circuit inputs for receiving first and second command signals, wherein the differential amplifier configuration comprises:
a differential amplifier having first and second inputs coupled to respective first and second circuit inputs, first and second differential outputs connected to respective control elements of the first and second sense FETs, and a control input for receiving a control signal,
and the common mode feedback circuit comprises:
a voltage divider connected between the first and second nodes, and
a transconductance amplifier having a first input for receiving a reference voltage and a second input connected to the voltage divider to receive a common mode voltage of a voice coil motor connected to the H-bridge, the transconductance amplifier having an output connected to the control input of the differential amplifier to adjust an output common mode voltage of the differential amplifier.

11. The driver circuit of claim 10, including a feedback circuit comprising:
a first feedback impedance connected between the second node and the first input of the differential amplifier, and
a second feedback impedance connected between the first node and the second input of the differential amplifier.

12. The diver circuit of claim 1 including first and second circuit inputs for receiving first and second command signals, wherein the differential amplifier configuration comprises:
a first amplifier having a first input for receiving the first command signal, a second input for receiving the second command signal and an output connected to the control element of the first sense FET,
a second amplifier having a first input for receiving the second command signal, a second input for receiving the first command signal and an output connected to the control element of the second sense FET, and
and the common mode feedback circuit includes:
a first divider comprising at least two divider impedances for serial connection across a voltage supply, the first input of the first amplifier being connected to a junction between the divider impedances of the first divider,
a second divider comprising at least two divider impedances for serial connection across the voltage supply, the first input of the second amplifier being connected to a junction between the divider impedances of the second divider,
a first impedance connected between the first node and the second input of the first amplifier, and
a second impedance connected between the second node and the second input of the second amplifier.

13. The driver circuit of claim 12, including
a third impedance connected between the first input of the first amplifier and the first circuit input, and
a fourth impedance connected between the first input of the second amplifier and the second circuit input.

14. The driver of claim 13, including
a fifth impedance connected between the second input of the first amplifier and the second circuit input, and
a sixth impedance connected between the second input of the second amplifier and the first circuit input.

15. The driver circuit of claim 1, wherein the first and second sense and power FETs are unmatched and the differential amplifier has a high open loop gain to compensate mis-matching of the first and second sense and power FETs.

16. The driver circuit of claim 1, including a feedback circuit comprising:
a first feedback impedance connected between the second node and a first input of the differential amplifier configuration, and
a second feedback impedance connected between the first node and a second input of the differential amplifier configuration.

17. A method of operating a driver circuit for supplying actuator current to a voice coil motor of an actuator of a disk drive, the driver circuit having
an H-bridge having first and second sense FETs and first and second power FETs, a first node between controlled elements of the first sense FET and the first power FET for connection to a first side of a voice coil motor and a second node between controlled elements of the second sense FET and the second power FET for connection to a second side of the voice coil motor, and
a differential amplifier configuration having first and second differential outputs connected to control elements of the first and second sense FETs for operating a voice coil motor connected between first and second nodes,
the method comprising:
operating the first and second power FETs to establish a bias current through the first and second sense FETs; and
adjusting an output common mode voltage of the differential amplifier so that a common mode voltage on a voice coil motor connected between the first and second nodes is equal to a predetermined common mode reference voltage.

18. The method of claim 17, including
setting a voltage on a gate of the first power FET so that a voltage at a source element of the first sense FET equals a voltage at a sense element of the first sense FET, and
setting a voltage on a gate of the second power FET so that a voltage at a source element of the second FET equals a voltage at a sense element of the second sense FET.

19. The method of claim 17, including
operating the first power FET to pass current equal to the sum of the actuator current and the bias current through the first sense FET, and
simultaneously operating the second power FET to pass current equal to the difference between the actuator current and the bias current through the second sense FET.

20. The method of claim 17, wherein the differential amplifier has a high open loop gain.

21. A method of operating a driver circuit for supplying actuator current to a voice coil motor of an actuator of a disk drive, the driver circuit having an H-bridge having first and second sense FETs and first and second power FETs, a first node between controlled elements of the first sense FET and the first power FET for connection to a first side of a voice coil motor and a second node between controlled elements of the second sense FET and the second power FET for connection to a second side of the voice coil motor, and a differential amplifier configuration having first and second differential outputs connected to control elements of the first and second sense FETs for operating a voice coil motor connected between first and second nodes, the method comprising:

operating the first and second power FETs to establish a bias current through the first and second sense FETs; and operating the H-bridge to achieve class AB operation.

22. The method of claim 21, including setting a voltage on a gate of the first power FET so that a voltage at a source element of the first sense FET equals a voltage at a sense element of the first sense FET, and setting a voltage on a gate of the second power FET so that a voltage at a source element of the second FET equals a voltage at a sense element of the second sense FET.

23. The method of claim 21, including operating the first power FET to pass current equal to the sum of the actuator current and the bias current through the first sense FET, and simultaneously operating the second power FETs to pass current equal to the difference between the actuator current and the bias current through the second sense FET.

24. The method of claim 21, wherein the differential amplifier has a high open loop gain.

* * * * *

UNITED STATES PATENT AND TRADEMARK OFFICE
CERTIFICATE OF CORRECTION

PATENT NO. : 6,229,273 B1
DATED : May 8, 2001
INVENTOR(S) : David W. Kelley et al.

It is certified that error appears in the above-identified patent and that said Letters Patent is hereby corrected as shown below:

Column 6,
Line 43, after FET, insert -- and --
Line 47, after FET, delete "and"

Column 7,
Line 35, delete "The diver" insert -- The driver --

Signed and Sealed this

Fifth Day of March, 2002

Attest:

JAMES E. ROGAN
*Attesting Officer*    *Director of the United States Patent and Trademark Office*